(12) United States Patent
Ewinger et al.

(10) Patent No.: US 6,738,703 B2
(45) Date of Patent: May 18, 2004

(54) METHOD OF OPERATING A BRAKING SYSTEM OF A PARKED MOTOR VEHICLE

(75) Inventors: Heinz Ewinger, Oberasbach (DE); Armin Farrenkopf, Nuremberg (DE); Juergen Groth, Nuremberg (DE); Thomas Just, Erlangen (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 10/433,721

(22) PCT Filed: Dec. 1, 2001

(86) PCT No.: PCT/EP01/14056
§ 371 (c)(1),
(2), (4) Date: Jun. 3, 2003

(87) PCT Pub. No.: WO02/46016
PCT Pub. Date: Jun. 13, 2002

(65) Prior Publication Data
US 2004/0026988 A1 Feb. 12, 2004

(30) Foreign Application Priority Data
Dec. 8, 2000 (DE) .......................................... 100 61 064

(51) Int. Cl.$^7$ ................................................ G06G 7/76
(52) U.S. Cl. ........................................ 701/70; 303/9.69
(58) Field of Search .............................. 701/1, 70, 71, 701/78, 82, 83; 188/156, 158; 303/9.69, 22.1

(56) References Cited

U.S. PATENT DOCUMENTS

| 5,667,282 A | | 9/1997 | Kim |
| 6,260,934 B1 | * | 7/2001 | Lee .............................. 303/192 |
| 6,450,587 B1 | * | 9/2002 | MacGregor et al. .......... 303/89 |
| 6,609,595 B2 | * | 8/2003 | Flynn et al. ................. 188/156 |
| 6,678,819 B1 | * | 1/2004 | Bouyoux ..................... 712/219 |

FOREIGN PATENT DOCUMENTS

| DE | 19814657 | 10/1999 |
| DE | 19849799 | 6/2000 |
| WO | WO00/73114 | 12/2000 |

* cited by examiner

Primary Examiner—Richard M. Camby
(74) Attorney, Agent, or Firm—W. F. Fasse; W. G. Fasse

(57) ABSTRACT

Proposed is a simple and cost-effective method that enables a safe operation of a motor vehicle comprising an electrical braking system with a parking brake.

During the parking of the motor vehicle, measuring processes are carried out in a certain time interval spacing, in which measured values of at least one vehicle-specific characteristic parameter are determined. In connection with the measured values determined in the measuring processes, a current desired value for prescribing the brake force for the parking brake is determined.

9 Claims, 1 Drawing Sheet

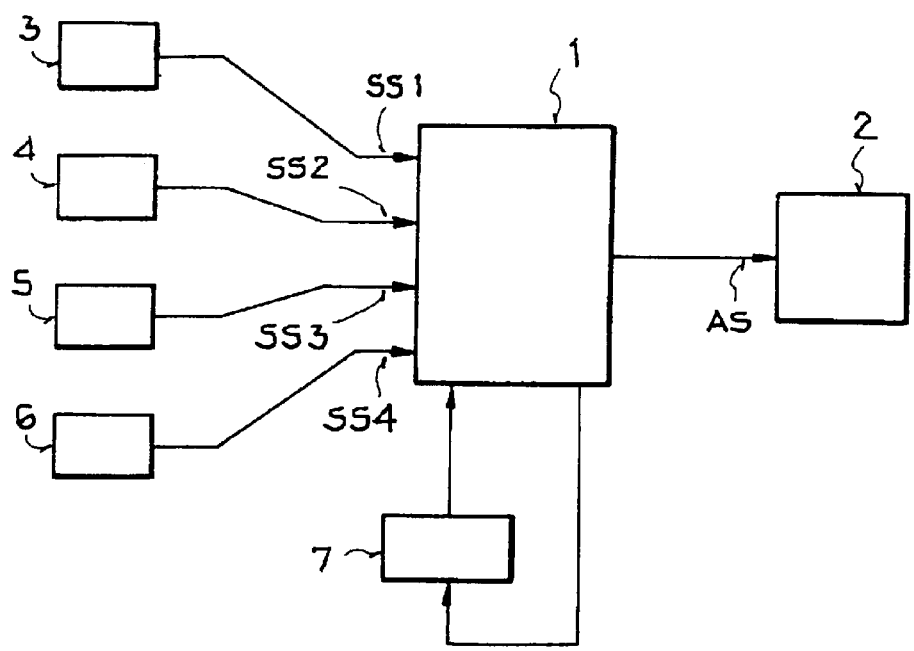

METHOD OF OPERATING A BRAKING SYSTEM OF A PARKED MOTOR VEHICLE

LITERAL TRANSLATION OF PCT INTERNATIONAL APPLICATION PCT/EP01/14056, AS FILED ON Dec. 1, 2001.

The invention relates to a method according to the preamble of the patent claim 1, as is known from the DE 198 14 657 A1.

In motor-driven motor vehicles, a parking brake is generally provided for arresting or fixing the motor vehicle in connection with the parking thereof. In this regard, the braking force for the parking brake should be selected only as great as necessary, in order to avoid an increased wear of the braking system. From the initially mentioned DE 198 14 657 A1 with a control and/or regulating apparatus for an electrical parking brake arrangement of motor vehicles, forming the general background of this art, it is known for this purpose to provide a sensor unit for measuring the slope of the inclined position of the vehicle; the braking force of the parking brake that is to be adjusted or set is prescribed in connection with the sensor signal of this slope sensor and thus corresponding to the established or fixed slope. However, with this information by itself, the braking force is often erroneously selected, because the actual required braking force can vary significantly also after the parking of the vehicle dependent on vehicle-specific conditions or external conditions, for example dependent on the varying loading of the vehicle, the condition of the braking system (for example due to wear or damages or defects of the braking system), the influences of the wind, or the change of the slope or inclination after the parking of the vehicle (for example upon parking in a duplex garage, on a vehicle transporter, or a ferry, etc.). The erroneous prescription or specification of the braking force can have critical situations that impair the safety as a result, especially a braking force that is too low can lead to the motor vehicle rolling away.

The underlying object of the invention is to propose a simple method for operating a motor-driven motor vehicle with a high reliability and safety.

This object is achieved according to the invention by the features in the characterizing portion of the patent claim 1. Advantageous embodiments of the method are the subject of the further patent claims.

The braking force for the (electrical) parking brake is adjusted or adapted to the current existing requirements even after the parking of the motor vehicle, that is to say the braking force for the parking brake is prescribed corresponding to the actual conditions also in the parked state of the motor vehicle. For this purpose, in connection with the parking of the motor vehicle, a first desired or nominal value is determined in connection with certain (vehicle-specific) characteristic parameters as the starting value of the braking force for the parking bake, especially in connection with the slope or inclination of the motor vehicle and/or the loading of the motor vehicle; in the parked state of the motor vehicle, this starting value of the braking force is monitored or checked in each measuring process of measuring processes that follow successively one after another at certain time intervals, in that respectively a current desired or nominal value for the braking force is determined on the basis of the measured values recorded for the (vehicle-specific) characteristic parameters in the measuring processes. As the (vehicle-specific) characteristic parameters, especially the speed and/or the acceleration of the motor vehicle are utilized as a measure for the motion of the motor vehicle, as well as the slope or inclination of the motor vehicle and the loading of the motor vehicle. If the current desired value for the braking force determined in connection with the measured values of the (vehicle-specific) characteristic parameters corresponds with the prescribed desired value, then the braking force for the (electrical) parking brake is prescribed without change, especially then if no motion of the motor vehicle takes place with the prescribed desired value for the braking force; if the current desired value for the braking force determined in connection with the measured values of the (vehicle specific) characteristic parameters deviates from the prescribed desired value, then the braking force for the (electrical) parking brake is prescribed in a corresponding adapted manner (increased or reduced), especially the desired value for the braking force is increased if a motion of the motor vehicle takes place with the prescribed desired value for the braking force. The time intervals at which the measuring processes for determining the measured values of the vehicle-specific characteristic parameters and therewith the desired value for the braking force follow successively one after another can be selected as desired in this context; especially the time intervals can be selected corresponding to the course or progression of the desired value, especially can be varied according to the time progression or course of the desired value for the braking force: for example in connection with a desired value for the braking force that remains constant or unchanged, also the time interval between the measuring processes can be maintained, and in connection with a required change of the desired value for the braking force, the time interval between the measuring processes can be shortened or reduced. The measured values of the vehicle-specific characteristic parameters recorded in the measuring processes are acquired by means of suitable sensors, especially the speed and/or the acceleration of the motor vehicle as a measure for the movement or motion of the motor vehicle by means of wheel rotational speed sensors and/or acceleration sensors, the slope or inclination of the motor vehicle by means of slope or inclination sensors, and the loading of the motor vehicle by means of spring travel sensors or loading sensors or load sensors. The desired values for the braking force to be prescribed in connection with the vehicle-specific characteristic parameters can be stored in a (multi-dimensional) characteristic value field or in a characteristic curve or in a table. The evaluation of the measured values of the vehicle-specific characteristic parameters and the prescribing of the desired values for the braking force is carried out by a control unit arranged in or on the motor vehicle, which, for example, can be integrated in a control device of the motor vehicle, or for example can be embodied as a control device of the motor vehicle.

A monitoring or checking on the parking of the motor vehicle is carried out by evaluation of criteria for certain or specific system values with the aid of plausibility considerations, for example by evaluation of at least one of the criteria for the following system values: the speed of the vehicle (this must be 0), the motor state of the motor vehicle (the motor of the motor vehicle must be stopped or switched off), the electronic key that is used for starting the operation of the motor vehicle (this ID transponder or authentication transponder must have transmitted a certain specified code), as well as the state of the doors of the motor vehicle, especially the driver's door of the motor vehicle (a certain specified closing state/opening state must be present).

The basic informations underlying the method can be acquired in a simple manner, especially by means of sensors already present in the motor vehicle, so that advantageously the "correct" braking force for the parking brake can be prescribed after the parking of the motor vehicle in a simple and cost-effective or economical manner, without the operator of the motor vehicle having to be concerned about this. Hereby the safety as well as the comfort for the operator of the motor vehicle can be increased, especially a rolling-away of the motor vehicle and an unnecessary wear of the parking brake can be avoided.

In connection with the drawing, the invention shall be explained in further detail, whereby a schematic block circuit diagram for carrying out the method is illustrated in the FIGURE.

According to the FIGURE, there is provided a control unit 1 (logic unit) which is arranged in the interior area or exterior area of the motor vehicle, and which is, for example, integrated in a control device of the motor vehicle, for example in a control device arranged on the rear axle of the motor vehicle. The sensor signals SS1, SS2, SS3, SS4 of plural sensors 3, 4, 5, 6 are provided as measured values to the control unit 1 (logic unit) as input signals; dependent on the sensor signals SS1, SS2, SS3, SS4, the control unit 1 (logic unit) actuates the electrical braking system 2 of the motor vehicle with an output signal AS (control signal) generated therefrom (for example by acting on the brake actuator for prescribing a certain specified braking force). The measured values underlying the sensor signals SS1, SS2, SS3, SS4 give information about plural vehicle-specific characteristic parameters, especially about the motion of the motor vehicle (or the standstill of the motor vehicle) as well as about the slope or inclination of the motor vehicle and the loading state of the motor vehicle. As sensors for detecting the measured values of the vehicle-specific characteristic parameters, for example on each wheel of the motor vehicle, wheel rotational speed sensors 3 are provided, of which the sensor signals SS1 are utilized as a measure for the speed of the motor vehicle and therewith for the motion of the motor vehicle, an acceleration sensor 4 or yaw rate sensor integrated in a control device or embodied as a separate sensor, of which the sensor signal SS2 is utilized as a measure for the acceleration of the motor vehicle, a slope or inclination sensor 5 integrated in a control device or embodied as a separate sensor, of which the sensor signal SS3 is utilized as a measure for the slope or inclination of the motor vehicle relative to the underlying ground, as well as a loading sensor 6 arranged in the area of the rear axle of the motor vehicle, of which the sensor signal SS4 is utilized as a measure for the loading state of the motor vehicle.

The sensor signals SS1, SS2, SS3, SS4 of the sensors 3, 4, 5, 6, and therewith the measured values of the vehicle-specific characteristic parameters, are evaluated by the control unit 1 (logic unit); by corresponding impingement or action on the braking actuator of the electrical braking system 2 with the output signal AS of the control unit 1 (logic unit), a certain determined (current) desired value for the (electrical) parking brake is prescribed:

During the parking of the motor vehicle, a first desired value dependent on vehicle-specific characteristic parameters is prescribed as a starting value for the braking force of the parking brake in connection with a characteristic field existing as a function of these vehicle-specific characteristic parameters or as a characteristic curve existing as a function of these vehicle-specific characteristic parameters or as a table; especially, the first desired value is prescribed dependent on the slope or inclination of the motor vehicle that exists during the parking process and the loading of the motor vehicle that exists during the parking process, and thus dependent on the sensor signal SS3 of the slope or inclination sensor 5 and the sensor signal SS4 of the loading sensor 6 in connection with a characteristic field (braking force as a function of the slope and the load) stored in the memory or storage unit 7, or in connection with a characteristic curve or table stored in the memory or storage unit 7. The values dependent on the vehicle-specific characteristic parameters of the characteristic field stored in the memory or storage unit 7, or of the characteristic curve or table stored in the memory or storage unit 7 can, in this context, be generated by calculation or can be obtained by experiment (empirically).

After the parking of the motor vehicle, the desired value for the braking force in the parked state is verified, and if necessary, adapted to the actual existing requirements, in that measuring processes are carried out at certain specified time interval spacings (for example the measuring processes are carried out every 500 ms), in which measured values for the speed and the acceleration of the motor vehicle are determined or acquired in connection with the sensor signals SS1, SS2, as well as also measured values for the slope or inclination and the loading state of the motor vehicle are determined or acquired in connection with the sensor signals SS3, SS4. If the speed and the acceleration of the motor vehicle is zero, then the prescribed desired value for the braking force is maintained; if on the contrary, the speed and/or the acceleration of the motor vehicle differs from zero, then the desired value for the braking force is increased (for example by a certain specified percentage or absolute amount, for example by 10%), that is to say a value that is increased in comparison to the previous prescribed desired value for the braking force is utilized as the current desired value for the braking force. If the slope and the loading state of the motor vehicle remain unchanged, then the prescribed desired value for the braking force is maintained; if on the contrary, the slope or the loading state of the motor vehicle change, then the desired value for the braking force is adapted (for example being increased or decreased by a certain specified percentage or absolute amount, for example by 10%). The current desired values for the braking force, which are determined in this manner in the measuring processes dependent on the slope and the loading state of the motor vehicle under consideration of the motion of the motor vehicle, can be provided to the memory or storage unit 7, that is to say the values of the characteristic field stored in the memory or storage unit 7 or of the characteristic curve or table stored in the memory or storage unit 7 are correspondingly adapted, especially for prescribing the starting values for the braking force of the parking brake in connection with the parking of the motor vehicle.

What is claimed is:

1. Method for operating a motor-driven motor vehicle with an electrical braking system (2) comprising a parking brake, characterized in that, in the parked state of the motor vehicle, measuring processes are carried out in a certain time interval spacing, in which measured values of at least one vehicle-specific characteristic parameter are determined, and in that, in connection with the measured values of the at least one vehicle-specific characteristic parameter determined in the measuring processes, a current desired value for prescribing the braking force for the parking brake is determined.

2. Method according to claim 1, characterized in that the speed and/or the acceleration of the motor vehicle are utilized as vehicle-specific characteristic parameters.

3. Method according to claim 1, characterized in that the slope of the motor vehicle is utilized as the vehicle-specific characteristic parameter.

4. Method according to claim 1, characterized in that the loading of the motor vehicle is utilized as the vehicle-specific characteristic parameter.

5. Method according to claim 1, characterized in that a starting value is prescribed as a first desired value of the braking force for the parking brake during the parking of the motor vehicle, and in that at least one vehicle-specific characteristic parameter is utilized for determining the starting value.

6. Method according to claim 5, characterized in that the slope of the motor vehicle is utilized as the vehicle-specific characteristic parameter for determining the starting value of the braking force for the parking brake.

7. Method according to claim 5, characterized in that the loading of the motor vehicle is utilized as the vehicle-specific characteristic parameter for determining the starting value of the braking force for the parking brake.

8. Method according to claim 1, characterized in that the desired values for the braking force are stored in a characteristic field or a characteristic curve or a table.

9. Method according to claim 8, characterized in that the stored desired values for the braking force are adapted in connection with the current desired values determined in the measuring processes.

* * * * *